US009068097B2

(12) United States Patent
Li et al.

(10) Patent No.: US 9,068,097 B2
(45) Date of Patent: Jun. 30, 2015

(54) BIAXIALLY ORIENTED POLYPROPYLENE FILM SUBSTRATE FREE FROM PRIMER COATING AND FILM FREE FROM PRIMER COATING

(75) Inventors: Tan Li, Hainan (CN); Hongcun Huang, Hainan (CN); Lianqin Hu, Hainan (CN)

(73) Assignee: HAINAN SHINER INDUSTRIAL CO., LTD. (CN)

( * ) Notice: Subject to any disclaimer, the term of this patent is extended or adjusted under 35 U.S.C. 154(b) by 239 days.

(21) Appl. No.: 13/516,388

(22) PCT Filed: Dec. 28, 2010

(86) PCT No.: PCT/CN2010/080339
§ 371 (c)(1),
(2), (4) Date: Jun. 15, 2012

(87) PCT Pub. No.: WO2011/079762
PCT Pub. Date: Jul. 7, 2011

(65) Prior Publication Data
US 2012/0251809 A1 Oct. 4, 2012

(30) Foreign Application Priority Data

Dec. 29, 2009 (CN) .......................... 2009 1 0215431
May 11, 2010 (CN) .......................... 2010 1 0177656

(51) Int. Cl.
*B32B 27/32* (2006.01)
*C09D 123/12* (2006.01)
(Continued)

(52) U.S. Cl.
CPC ............ *C09D 123/12* (2013.01); *Y10T 428/265* (2015.01); *C09D 4/06* (2013.01); *C09D 133/02* (2013.01); *C09D 133/08* (2013.01)

(58) Field of Classification Search
CPC .......... B32B 27/32; C09D 4/06; C09D 123/12
USPC .......... 428/212, 220, 385.35, 336, 451, 484.1
See application file for complete search history.

(56) References Cited

U.S. PATENT DOCUMENTS

2002/0187326 A1  12/2002  Kong
2008/0015288 A1*  1/2008  Antoine et al. ................. 524/69

FOREIGN PATENT DOCUMENTS

CN  2037727 U   5/1989
CN  1476969 A   2/2004
(Continued)

OTHER PUBLICATIONS

Notification of the First Office Action for Chinese Application No. 2010101776562; Date of Notification, Nov. 2, 2011 with English Translation.
(Continued)

*Primary Examiner* — Aaron Austin
*Assistant Examiner* — Lawrence Ferguson
(74) *Attorney, Agent, or Firm* — Cantor Colburn LLP

(57) ABSTRACT

Disclosed is a biaxially oriented polypropylene film substrate free from primer coating, which comprises successively connected affinity layer, core layer and surface layer, said affinity layer comprises 10% to 80% by weight of polypropylene homopolymer, 10% to 80% by weight of polyolefin plastomer and 1% to 10% by weight of anti-adhesion agent; said core layer is polypropylene homopolymer; said surface layer is the same as the affinity layer or a non-coated surface layer that comprises 90% to 99% by weight of polypropylene homopolymer and 1% to 10% by weight of anti-adhesion agent. A film free from primer coating and its preparing method are also provided. The coated film of this invention does not need the process of primer pre-coating, which reduces the relevant equipment costs on one hand and avoids the safety risks when using and restoring solvent type primer on the other.

18 Claims, 1 Drawing Sheet

(51) Int. Cl.
*C09D 4/06* (2006.01)
*C09D 133/02* (2006.01)
*C09D 133/08* (2006.01)

(56) References Cited

FOREIGN PATENT DOCUMENTS

| CN | 201275911 Y | 7/2009 |
|---|---|---|
| CN | 100537227 C | 9/2009 |
| CN | 101531082 A | 9/2009 |
| CN | 101817246 A | 9/2010 |
| CN | 101817247 A | 9/2010 |

OTHER PUBLICATIONS

International Search Report for International Application No. PCT/CN2010/080339 mailing date of Apr. 21, 2011 with English Translation.

* cited by examiner

BIAXIALLY ORIENTED POLYPROPYLENE FILM SUBSTRATE FREE FROM PRIMER COATING AND FILM FREE FROM PRIMER COATING

CROSS REFERENCE TO RELATED APPLICATIONS

This is a U.S. national stage of application No. PCT/CN2010/080339, filed on 28 Dec. 2010. Priority under 35 U.S.C. §119(a) and 35 U.S.C. §365(b) is claimed from Chinese Application No. 200910215431.9, filed 29 Dec. 2009, and Chinese Application No. 201010177656.2, filed 11 May 2010, the disclosure of which are also incorporated herein by references.

FIELD OF THE INVENTION

The present invention relates to the field of polymer film, in particular, it relates to a film substrate free from primer and the preparation method thereof, and a coated film free from primer and the preparation method thereof.

BACKGROUND OF THE INVENTION

Biaxially oriented polypropylene films are made by co-extruding polypropylene granules into sheets, followed by stretching both transversally and longitudinally. The biaxially oriented polypropylene films have better mechanical property, high transparency and glossiness, and are currently the most widely used printed film.

In order to make the biaxially oriented polypropylene films have more excellent mechanical property, barrier property or heat sealability property and other properties, the biaxially oriented polypropylene films are typically subjected to be coated to produce coated films. When traditional biaxially oriented polypropylene films are coated as substrate, in order to deal with the problem that surface coating polyvinylidene chloride and other coatings are difficult to be firmly attached to film substrate, typically, the films are first subjected to corona treatment so that the surface tension reaches 38-42 dynes, solvent type polyurethane and other adhesives are then pre-coated, after drying, polyvinylidene chloride and other surface coatings are coated. The technological processes are as follows: corona treatment of substrate surface—pre-coating of primer—drying—surface coating—drying.

However, primer coating has the following defects: (1) the vaporization of toluene, ethyl acetate, and other solvents used in solvent type primer during the production process causes pollution to the surrounding environment, and also endanger the health of operators; (2) residues of toluene, ethyl acetate, and other solvents on coated film contaminate foods, drugs, etc. packaged therein, which endanger the health of consumers; (3) toluene, ethyl acetate, and other solvents are all inflammable and explosive materials, great safety risks exist in the storage of solvents; (4) drying equipment is required to match the pre-coated primer, which increase the consumption of fuel gas, electricity power and other energy, and therefore the production costs are higher. Although the environmental issue has been improved to some extent with the development of water-based adhesives in recent year, the problem always exists, that is the adhesive ability of water-based adhesives decreases with the increase of environmental humidity, and the costs are still very high.

SUMMARY OF THE INVENTION

Aiming at the problems of environmental protection pressures and high costs currently facing the traditional coated films, the problems to be solved by the present invention are: providing a novel biaxially oriented polypropylene film substrate and coated film made therefrom, said coated film being free from primer and possessing the physicochemical properties of the existing film with primer coating.

To address the above technical problem, the present invention provides a biaxially oriented polypropylene film substrate free from primer, which comprises successively connected affinity layer, core layer and surface layer, said affinity layer comprises: 10% to 80% by weight of polypropylene homopolymer, 10% to 80% by weight of polyolefin plastomer and 1% to 10% by weight of anti-adhesion agent; said core layer is polypropylene homopolymer; said surface layer is the same as the affinity layer or a non-coated surface layer that comprises 90% to 99% by weight of polypropylene homopolymer and 1% to 10% by weight of anti-adhesion agent.

Preferably, the thickness of the affinity layer is 1 μm to 10 μm.

Preferably, the thickness of the non-coated surface layer is 1 μm to 10 μm.

Preferably, the total thickness of the biaxially oriented polypropylene film substrate is 10 μm to 60 μm.

Preferably, the active ingredients content of the anti-adhesion agent is 500 PPM to 5000 PPM.

The present invention also provides a coated film free from primer, which comprises the above-mentioned biaxially oriented polypropylene film substrate and a coating layer placed on the surface of the substrate, said coating layer is polyvinylidene chloride coating, acrylic acid coating or modified polyvinyl alcohol coating;

the polyvinylidene chloride coating is formed by coating the substrate surface with the following ingredients followed by drying: 30% to 95% by weight of polyvinylidene chloride emulsion, 0 to 50% by weight of softened water, 1% to 12% by weight of slip agent and 0.05% to 5% by weight of anti-adhesion agent; said polyvinylidene chloride emulsion is formed by reaction of 85% to 95% by weight of polyvinylidene chloride, 0.5% to 10% by weight of methyl methacrylate, 0.5% to 3.5% by weight of methyl acrylate, 0.01% to 0.3% by weight of catalyst and 0.2% to 3.5% by weight of emulsifying agent;

the acrylic acid coating is formed by coating the substrate surface with the following ingredients followed by drying: 25% to 95% by weight of acrylic acid emulsion, 0 to 70% by weight of softened water, 2% to 15% by weight of slip agent and 0.1% to 5% by weight of anti-adhesion agent, said acrylic acid emulsion is formed by copolymerization of 10% to 80% by weight of acrylic acid and 20% to 90% by weight of methyl acrylate or ethyl acrylate;

the modified polyvinyl alcohol coating is formed by coating the substrate surface with the following ingredients followed by drying: 50% to 100% by weight of modified polyvinyl alcohol solution, 0 to 40% by weight of softened water, 0 to 10% by weight of slip agent and 0 to 4% by weight of anti-adhesion agent; said polyvinyl alcohol solution is formed by reaction of 5% to 15% by weight of polyvinyl alcohol, 82% to 92% by weight of softened water, 0.05% to 0.1% by weight of catalyst, 0.5% to 2% by weight of condensing agent, 0.1% to 0.5% by weight of antifoaming agent and 0.5% to 1.5% by weight of anti-adhesion agent.

Preferably, the coating layer is placed on one surface or both surfaces of the substrate.

Preferably, the solid content of the polyvinylidene chloride coating is 20% to 60%, the solid content of slip agent is 10% to 30%, and the solid content of anti-adhesion agent is 5% to 20%.

Preferably, the solid content of the acrylic acid emulsion is 10% to 50%, the solid content of slip agent is 10% to 30%, and the solid content of anti-adhesion agent is 5% to 20%.

Preferably, the solid content of the modified polyvinyl alcohol solution is 5% to 20%, the solid content of slip agent is 10% to 30%, and the solid content of anti-adhesion agent is 5% to 20%.

Preferably, the thickness of the polyvinylidene chloride coating is 0.3 μm to 6.0 μm; the thickness of the acrylic acid coating is 0.3 μm to 3.5 μm; and the thickness of the modified polyvinyl alcohol is 0.3 μm to 2.0 μm.

Preferably, the slip agent is palm wax.

Preferably, the anti-adhesion agent is silica.

The present invention further provides a manufacturing method of a coated film, which comprises:

the above-mentioned biaxially oriented polypropylene film substrate is subjected to corona treatment;

the polyvinylidene chloride coating, acrylic acid coating or modified polyvinyl alcohol coating is uniformly coated onto the corona surface of the biaxially oriented polypropylene film substrate, and the film is dried after the completion of coating to obtain coated film;

the polyvinylidene chloride coating is formed by coating the substrate surface with the following ingredients followed by drying: 30% to 95% by weight of polyvinylidene chloride emulsion, 0 to 50% by weight of softened water, 1% to 12% by weight of slip agent and 0.05% to 5% by weight of anti-adhesion agent; said polyvinylidene chloride emulsion is formed by reaction of 85% to 95% by weight of polyvinylidene chloride, 0.5% to 10% by weight of methyl methacrylate, 0.5% to 3.5% by weight of methyl acrylate, 0.01% to 0.3% by weight of catalyst and 0.2% to 3.5% by weight of emulsifying agent;

the acrylic acid coating is formed by coating the substrate surface with the following ingredients followed by drying: 25% to 95% by weight of acrylic acid emulsion, 0 to 70% by weight of softened water, 2% to 15% by weight of slip agent and 0.1% to 5% by weight of anti-adhesion agent, said acrylic acid emulsion is formed by copolymerization of 10% to 80% by weight of acrylic acid and 20% to 90% by weight of methyl acrylate or ethyl acrylate;

the modified polyvinyl alcohol coating is formed by coating the substrate surface with the following ingredients followed by drying: 50% to 100% by weight of modified polyvinyl alcohol solution, 0 to 40% by weight of softened water, 0 to 10% by weight of slip agent and 0 to 4% by weight of anti-adhesion agent; said polyvinyl alcohol solution is formed by reaction of 5% to 15% by weight of polyvinyl alcohol, 82% to 92% by weight of softened water, 0.05% to 0.1% by weight of catalyst, 0.5% to 2% by weight of condensing agent, 0.1% to 0.5% by weight of antifoaming agent and 0.5% to 1.5% by weight of anti-adhesion agent.

Preferably, the coating weight of the polyvinylidene chloride coating is 0.4 g/m$^2$ to 7.5 g/m$^2$; the coating weight of the acrylic acid coating is 0.35 g/m$^2$ to 4.0 g/m$^2$; the coating weight of the modified polyvinyl alcohol coating is 0.25 g/m$^2$ to 1.8 g/m$^2$.

Preferably, the coating speed is 100 to 250 m/min.

Preferably, the drying mode is either hot air drying or far infrared drying or both. The drying temperature is 90☐ to 140☐, and drying time is 5 to 20 seconds.

Preferably, the coating is reverse roll-kiss coating.

The affinity layer of the biaxially oriented polypropylene film provided in the present invention has good bonding strength with polyvinylidene chloride coating or acrylic acid coating or modified polyvinyl alcohol coating, etc. Therefore, using the biaxially oriented polypropylene film of the present invention as coating substrate enables direct supplying of polyvinylidene chloride coating or acrylic acid coating or modified polyvinyl alcohol coating, etc., without pre-coating of known adhesive primer such as polyurethane. The obtained coated films achieve the same barrier property that blocks oxygen (or water vapor) and/or heat sealability property as the pre-coated primer coating film.

The coated film of this invention does not need the process of pre-coating primer, which reduces equipment costs on one hand and avoids the safety risks when using and restoring solvent type primer on the other, especially reduces the production costs considerably, which complies with the national industrial policies for constructing a conservation-oriented society, and thus improves the comprehensive competitiveness of the product.

DESCRIPTION OF THE PREFERRED EMBODIMENTS

To further understand the present invention, preferred embodiments of the present invention are described in detail in combination with the following examples. However, it should be understood that these descriptions are only for further illustrating the characteristics and advantages of the present invention, but not for limiting the claims of the present invention.

The anti-adhesion agents in the following examples are silica, trade name ABPP05, provided by A. Schulman, Inc. (Belgium). The slip agents are palm wax, trade name KP9800, provided by Asahi Kasei Corporation (Japan).

Example 1

Figure 1:
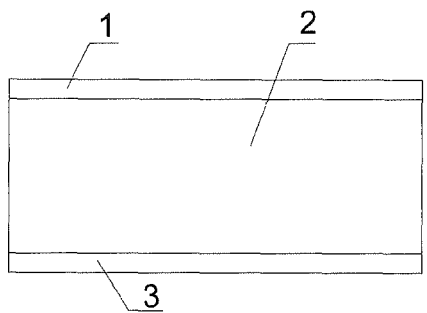
FIG. 1 is the structural diagram of the biaxially oriented polypropylene film substrate provided in Example 1 of the present invention.

FIG. 1 shows the structural diagram of the biaxially oriented polypropylene film prepared in Example 1. A biaxially oriented polypropylene film with the thickness of 10 μm was produced by using co-extrusion process, which comprising successively: affinity layer 1, core layer 2 and affinity layer 3, wherein the affinity layer 1 comprised 48% by weight of polypropylene homopolymer, 50% by weight of ethylene acrylate copolymer and 2% by weight of anti-adhesion agent (active content is 1000 PPM), the extrusion thickness of the affinity layer 1 was 1 μm, which was subjected to corona treatment, and the treatment value of the same day was 41 dynes; the core layer 2 comprised 100% of polypropylene homopolymer; the affinity layer 3 comprised 60% by weight of polypropylene homopolymer, 35% by weight of ethylene acrylate copolymer and 5% by weight of anti-adhesion agent (active content is 2500 PPM), the extrusion thickness of the affinity layer 3 was 1 μm, which was subjected to corona treatment, and the treatment value of the same day was 41 dynes.

Example 2

Figure 2:
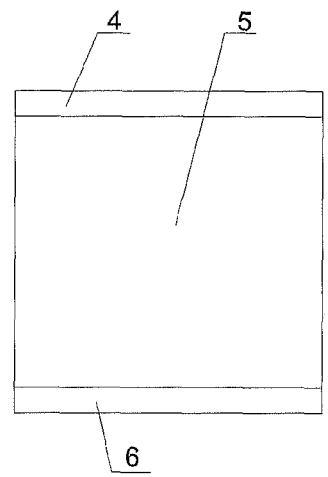
FIG. 2 is the structural diagram of the biaxially oriented polypropylene film substrate provided in Example 2 of the present invention.

FIG. 2 shows the structural diagram of the biaxially oriented polypropylene film prepared in Example 2. A biaxially oriented polypropylene film with the thickness of 25 μm was produced by using co-extrusion process, which comprised successively: affinity layer 4, core layer 5 and non-coated surface layer 6, wherein the affinity layer 4 comprised 50% by weight of polypropylene homopolymer, 48% by weight of ethylene acrylate copolymer and 2% by weight of anti-adhesion agent (active content is 1000 PPM), the extrusion thickness of the affinity layer 4 was 2 μm, which was subjected to corona treatment, and the treatment value of the same day was 41 dynes; the core layer 5 comprised 100% of homopolymer polypropylene; the non-coated surface layer 6 comprised 98% by weight of polypropylene homopolymer and 2% by weight of anti-adhesion agent (active content being 1000 PPM), the extrusion thickness of the non-coated surface layer 6 was 2 μm.

Example 3

Figure 3:
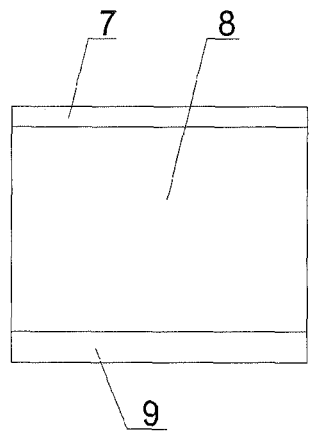
FIG. 3 is the structural diagram of the biaxially oriented polypropylene film substrate provided in Example 3 of the present invention.

FIG. 3 shows the structural diagram of the biaxially oriented polypropylene film prepared in Example 3. A biaxially oriented polypropylene film with the thickness of 35 μm was produced by using co-extrusion process, which comprised successively: affinity layer 7, core layer 8 and affinity layer 9, wherein the affinity layer 7 comprised 68% by weight of polypropylene homopolymer, 30% by weight of ethylene acrylate copolymer and 2% by weight of anti-adhesion agent (active content being 1000 PPM), the extrusion thickness of the affinity layer 7 was 2 μm, which was subjected to corona treatment, and the treatment value of the same day was 41 dynes; the core layer 8 comprised 100% of homopolymer polypropylene; the affinity layer 9 comprised 50% by weight of polypropylene homopolymer, 45% by weight of ethylene acrylate copolymer and 5% by weight of anti-adhesion agent (active content being 1000 PPM), the extrusion thickness of the affinity layer 9 was 3 μm, which was subjected to corona treatment, and the treatment value of the same day was 41 dynes.

Example 4

Figure 4:
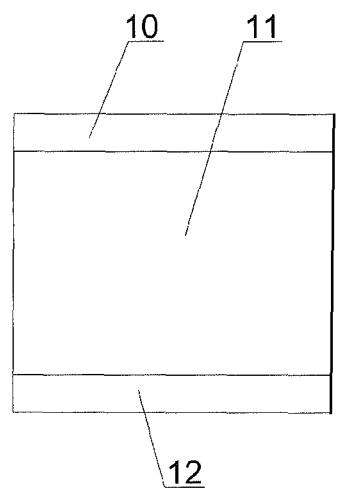
FIG. 4 is the structural diagram of the biaxially oriented polypropylene film substrate provided in Example 4 of the present invention.

FIG. 4 shows the structural diagram of the biaxially oriented polypropylene film prepared in Example 4. A biaxially oriented polypropylene film with the thickness of 40 μm was produced by using co-extrusion process, which comprised successively: affinity layer 10, core layer 11 and non-coated surface layer 12, wherein the affinity layer 10 comprised 78% by weight of polypropylene homopolymer, 20% by weight of ethylene acrylate copolymer and 2% by weight of anti-adhesion agent (active content being 1000 PPM), the extrusion thickness of the affinity layer 10 was 5 μm, which was subjected to corona treatment, and the treatment value of the same day was 41 dynes; the core layer 11 comprised 100% of homopolymer polypropylene; the non-coated surface layer 12 comprised 98% by weight of polypropylene homopolymer and 2% by weight of anti-adhesion agent (active content being 1000 PPM), the extrusion thickness of the non-coated surface layer 12 was 5 μm.

Example 5

Figure 5:
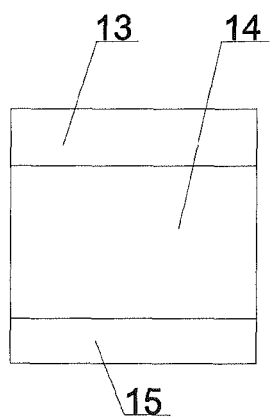
FIG. 5 is the structural diagram of the biaxially oriented polypropylene film substrate provided in Example 5 of the present invention.

FIG. 5 shows the structural diagram of the biaxially oriented polypropylene film prepared in Example 5. A biaxially oriented polypropylene film with the thickness of 45 μm was produced by using co-extrusion process, which comprised successively: affinity layer 13, core layer 14 and non-coated surface layer 15, wherein the affinity layer 13 comprised 54% by weight of polypropylene homopolymer, 44% by weight of ethylene acrylate copolymer and 2% by weight of anti-adhesion agent (active content being 1000 PPM), the extrusion thickness of the affinity layer 13 was 10 μm, which was subjected to corona treatment, and the treatment value of the same day was 41 dynes; the core layer 14 comprised 100% of homopolymer polypropylene; the non-coated surface layer 15 comprised 98% by weight of polypropylene homopolymer and 2% by weight of anti-adhesion agent (active content being 1000 PPM), the extrusion thickness of the non-coated surface layer 15 was 8 μm.

Example 6

Figure 6:
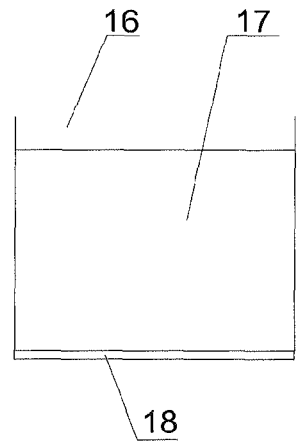
FIG. 6 is the structural diagram of the biaxially oriented polypropylene film substrate provided in Example 6 of the present invention.

FIG. 6 shows the structural diagram of the biaxially oriented polypropylene film prepared in Example 6. A biaxially oriented polypropylene film with the thickness of 60 μm was produced by using co-extrusion process, which comprised successively: affinity layer 16, core layer 17 and non-coated surface layer 18, wherein the affinity layer 16 comprised 60% by weight of polypropylene homopolymer, 38% by weight of ethylene acrylate copolymer and 2% by weight of anti-adhesion agent (active content being 1000 PPM), the extrusion thickness of the affinity layer 16 was 8 μm, which was subjected to corona treatment, and the treatment value of the same day was 41 dynes; the core layer 17 comprised 100% of homopolymer polypropylene; the non-coated surface layer 18 comprised 98% by weight of polypropylene homopolymer and 2% by weight of anti-adhesion agent (active content being 1000 PPM), the extrusion thickness of the non-coated surface layer 18 was 2 μm.

Example 7

This example used the following materials:

☐. Substrate: a biaxially oriented polypropylene film substrate with the thickness of 10 μm, which comprised successively: affinity layer, core layer and non-coated surface layer, wherein the affinity layer comprised 50% by weight of polypropylene homopolymer, 48% by weight of ethylene acrylate copolymer and 2% by weight of anti-adhesion agent (active content being 1000 PPM), the extrusion thickness of the affinity layer was 1 μm, which was subjected to corona treatment, and the treatment value of the same day was 41 dynes; the core layer comprised 100% of homopolymer polypropylene; the non-coated surface layer comprised 98% by weight of polypropylene homopolymer and 2% by weight of anti-adhesion agent (active content being 1000 PPM), the extrusion thickness of the non-coated surface layer was 1 μm;

☐. Polyvinylidene chloride emulsion: formed by the copolymerization of 91.5% by weight of polyvinylidene chloride, 5.5% by weight of methyl methacrylate and 3% by weight of methyl acrylate, the solid content was 45%.

The preparation method of the coated film provided by this embodiment was as follows:

1. 100 kg polyvinylidene chloride emulsion was added into a stainless steel container, 1.5 kg slip agent, 2 kg anti-adhesion agent and 50 kg softened water are added successively while stirring, polyvinylidene chloride coating was yielded after homogenously stirring.

2. The polyvinylidene chloride coating prepared in Step 1 was uniformly coated onto the surface of the substrate where the affinity layer was placed by reverse roll-kiss coating mode, the coating weight was 1.9 g/m², and the coating speed was 220 m/min.

3. After coating, the film was dried by far infrared, and the product film was rolled up, the drying temperature was 120□, and the drying time was 16 seconds.

4. After drying, it was cut into products of different specifications according to the requirements of users; therefore the coated film coated with polyvinylidene chloride coating on single surface of the substrate was formed.

Example 8

This example used the following materials:

□. Substrate: a biaxially oriented polypropylene film substrate with the thickness of 25 μm, which comprised successively: affinity layer, core layer and non-coated surface layer, wherein, the affinity layer comprised 78% by weight of polypropylene homopolymer, 20% by weight of ethylene acrylate copolymer and 2% by weight of anti-adhesion agent (active content being 1000 PPM), the extrusion thickness of the affinity layer was 1 μm, which was subjected to corona treatment, and the treatment value of the same day was 41 dynes; the core layer comprised 100% of homopolymer polypropylene; the non-coated surface layer comprised 98% by weight of polypropylene homopolymer and 2% by weight of anti-adhesion agent (active content being 1000 PPM), the extrusion thickness of the non-coated surface layer was 1 μm;

□. Acrylic acid emulsion: formed by the copolymerization of 80% by weight of acrylic acid and 20% by weight of ethyl acrylate, the solid content was 20%.

The preparation method of the coated film provided by this embodiment was as follows:

1. 200 kg acrylic acid emulsion was added into a stainless steel container, 2.2 kg slip agent, 2.7 kg anti-adhesion agent and 70 kg softened water are added successively while stirring, acrylic acid coating was made after homogenously stirring.

2. The modified polyvinyl alcohol coating prepared in Step 1 was uniformly coated onto the surface of the substrate film where the affinity layer was placed by reverse roll-kiss coating mode. The coating weight was 1.0 g/m², the coating speed was 180 m/min.

3. After coating, the film was dried by far infrared, and the product film was rolled up, the drying temperature was 120□, the drying time was 19 seconds.

4. After drying, it was cut into products of different specifications according to the requirements of users; therefore coated film coated with acrylic acid coating on single surface of the substrate was formed.

Example 9

This example used the following materials:

□. Substrate: a biaxially oriented polypropylene film substrate with the thickness of 35 μm, which comprised successively: affinity layer, core layer and non-coated surface layer, the affinity layer comprised 54% by weight of polypropylene homopolymer, 44% by weight of ethylene acrylate copolymer and 2% by weight of anti-adhesion agent (active content being 1000 PPM), the extrusion thickness of the affinity layer was 1 μm, which was subjected to corona treatment, and the treatment value of the same day was 41 dynes; the core layer comprised 100% of homopolymer polypropylene; the non-coated surface layer comprised 98% by weight of polypropylene homopolymer and 2% by weight of anti-adhesion agent (active content being 1000 PPM), the extrusion thickness of the non-coated surface layer was 1 μm;

□. Modified polyvinyl alcohol solution: formed by the reaction of 8% by weight of polyvinyl alcohol and 1% by weight of urea, the solid content was 7%.

The preparation method of the coated film provided by this embodiment was as follows:

1. 250 kg modified polyvinyl alcohol solution was added into a stainless steel container, 1.8 kg slip agent, 0.7 kg anti-adhesion agent and 40 kg softened water are added successively while stirring, modified polyvinyl alcohol coating was made after homogenously stirring.

2. The acrylic acid coating prepared in Step 1 was uniformly coated onto the surface of the substrate film where the affinity layer was placed by reverse roll-kiss coating mode, the coating weight was 0.6 g/m², the coating speed was 190 m/min.

3. After coating, the film was dried by far infrared, and the product film was rolled up, the drying temperature was 120□, the drying time was 18 seconds.

4. After drying, it was cut into products of different specifications according to the requirements of users; therefore coated film coated with modified polyvinyl alcohol coating on single surface of the substrate was formed.

Example 10

This example used the following materials:

□. Substrate: a biaxially oriented polypropylene film with the thickness of 19 μm, which comprised successively: first affinity layer, core layer and second affinity layer, the first affinity layer comprised 48% by weight of polypropylene homopolymer, 50% by weight of ethylene acrylate copolymer and 2% by weight of anti-adhesion agent (active content being 1000 PPM), the extrusion thickness of the first affinity layer was 1 μm, which was subjected to corona treatment, and the treatment value of the same day was 41 dynes; the core layer comprised 100% of homopolymer polypropylene; the second affinity layer comprised 60% by weight of polypropylene homopolymer, 35% by weight of ethylene acrylate copolymer and 5% by weight of anti-adhesion agent (active content being 2500 PPM), the extrusion thickness of the second affinity layer was 1 μm, which was subjected to corona treatment, and the treatment value of the same day was 41 dynes;

□. Modified polyvinyl alcohol solution: formed by the reaction of 10% by weight of polyvinyl alcohol and 1.2% by weight of urea, the solid content was 8.8%.

□. Acrylic acid emulsion: formed by the copolymerization of 80% by weight of acrylic acid and 20% by weight of ethyl acrylate, the solid content was 20%.

The preparation method of the coated film provided by this embodiment was as follows:

1. 200 kg modified polyvinyl alcohol solution was added into a stainless steel container, 1.5 kg slip agent, 0.6 kg anti-adhesion agent and 50 kg softened water are added successively while stirring, modified polyvinyl alcohol coating was made after homogenously stirring.

2. The modified polyvinyl alcohol coating prepared in Step 1 was uniformly coated onto the surface of the substrate film on which the first affinity layer was placed by reverse roll-kiss coating mode, the coating weight was 1.0 g/m², the coating speed was 170 m/min.

3. After coating, the film was dried by far infrared, and the product film was rolled up, the drying temperature was 120□, the drying time was 20 seconds.

4. 300 kg acrylic acid emulsion was added into a stainless steel container, 4.2 kg slip agent, 3.2 kg anti-adhesion agent and 80 kg softened water are added successively while stirring, was made after homogenously stirring.

5. The acrylic acid coating prepared in Step 4 was uniformly coated onto the surface of the substrate film on which the second affinity layer was placed by reverse roll-kiss coating mode, the coating weight was 0.7 g/m², the coating speed was 200 m/min.

6. After coating, the film was dried by far infrared, and the product film was rolled up, the drying temperature was 120□, the drying time was 16 seconds.

7. After drying, it was cut into products of different specifications according to the requirements of users, therefore coated film coated with modified polyvinyl alcohol coating on one surface and coated with acrylic acid coating on the other surface of the substrate was formed.

Example 11

This example used the following materials:

□. Substrate: a biaxially oriented polypropylene film with the thickness of 22 μm, which comprised successively: first affinity layer, core layer and second affinity layer, the first affinity layer comprised 68% by weight of polypropylene homopolymer, 30% by weight of ethylene acrylate copolymer and 2% by weight of anti-adhesion agent (active content being 1000 PPM), the extrusion thickness of the affinity layer was 1 μm, which was subjected to corona treatment, and the treatment value of the same day was 41 dynes; the core layer comprised 100% of homopolymer polypropylene; the second affinity layer comprised 50% by weight of polypropylene homopolymer, 45% by weight of ethylene acrylate copolymer and 5% by weight of anti-adhesion agent (active content being 1000 PPM), the extrusion thickness of the affinity layer was 1 μm, which was subjected to corona treatment, and the treatment value of the same day was 41 dynes;

□. Polyvinylidene chloride emulsion: formed by the copolymerization of 91.6% by weight of polyvinylidene chloride with 3.4% by weight of methyl methacrylate and 5.0% by weight of methyl acrylate, the solid content was 49%.

□. Acrylic acid emulsion: formed by the copolymerization of 80% by weight of acrylic acid with 20% by weight of ethyl acrylate, the solid content was 20%.

The preparation method of the coated film provided by this embodiment was as follows:

1. 120 kg polyvinylidene chloride emulsion was added into a stainless steel container, 2.0 kg slip agent, 1.8 kg anti-adhesion agent and 45 kg softened water are added successively while stirring, polyvinylidene chloride coating was made after homogenously stirring.

2. The modified polyvinylidene chloride coating prepared in Step 1 was uniformly coated onto the surface of the substrate film on which the first affinity layer was placed by reverse roll-kiss coating mode, the coating weight was 2.4 g/m², the coating speed was 220 m/min.

3. After coating, the film was dried by far infrared, and the product film was rolled up, the drying temperature was 118□, the drying time was 24 seconds.

4. 220 kg acrylic acid emulsion was added into a stainless steel container, 3.5 kg slip agent, 2.3 kg anti-adhesion agent and 40 kg softened water are added successively while stirring, acrylic acid coating was made after homogenously stirring.

5. By reverse roll-kiss coating mode, the acrylic acid coating prepared in Step 4 was uniformly coated onto the surface of the substrate film on which the second affinity layer was placed, the coating weight was 0.9 g/m², the coating speed was 150 m/min.

6. After coating, the film was dried by far infrared, and the product film was rolled up, the drying temperature was 120□, the drying time was 21 seconds.

7. After drying, it was cut into products of different specifications according to the requirements of users, therefore coated film coated with polyvinylidene chloride coating on one surface and coated with acrylic acid coating on the other surface of the substrate was formed.

Example 12

This example used the following materials:

□. Substrate: a biaxially oriented polypropylene film with the thickness of 20 μm, which comprised successively: first affinity layer, core layer and second affinity layer, the first affinity layer comprised 48% by weight of polypropylene homopolymer, 50% by weight of ethylene acrylate copolymer and 2% by weight of anti-adhesion agent (active content being 1000 PPM), the extrusion thickness of the first affinity layer was 1 μm, which was subjected to corona treatment, and the treatment value of the same day was 41 dynes; the core layer comprised 100% of homopolymer polypropylene; the second affinity layer comprised 60% by weight of polypropylene homopolymer, 35% by weight of ethylene acrylate copolymer and 5% by weight of anti-adhesion agent (active content being 2500 PPM), the extrusion thickness of the second affinity layer was 1 μm, which was subjected to corona treatment, and the treatment value of the same day was 41 dynes;

□. Acrylic acid emulsion: formed by the copolymerization of 80% by weight of acrylic acid with 20% by weight of ethyl acrylate, the solid content was 20%.

The preparation method of the coated film provided by this embodiment was as follows:

1. 220 kg acrylic acid emulsion was added into a stainless steel container, 3.4 kg slip agent, 2.2 kg anti-adhesion agent and 60 kg softened water are added successively while stirring, acrylic acid coating was made after homogenously stirring.

2. The acrylic acid coating prepared in Step 1 was uniformly coated onto one surface of the substrate film on which the first affinity layer was placed by reverse roll-kiss coating mode, the coating weight was 1.0 g/m², the coating speed was 160 m/min.

3. After coating, the film was dried by far infrared, and the product film was rolled up, the drying temperature was 120□, the drying time was 20 seconds.

4. 180 kg acrylic acid emulsion was added into a stainless steel container, 3.0 kg slip agent, 2.8 kg anti-adhesion agent and 50 kg softened water are added successively while stirring, acrylic acid coating was made after homogenously stirring.

5. The acrylic acid coating prepared in Step 4 was uniformly coated onto one surface of the substrate film on which the second affinity layer was placed by reverse roll-kiss coating mode, the coating weight was 0.7 g/m², the coating speed was 200 m/min.

6. After coating, the film was dried by far infrared, and the product film was rolled up, the drying temperature was 115□, the drying time was 15 seconds.

7. After drying, it was cut into products of different specifications according to the requirements of users; therefore coated film coated with acrylic acid coating on both surfaces of the substrate was formed.

The above described what is provided by the present invention in detail. Specific examples are used herein to illustrate the principles and embodiments of the present invention. The description of the above examples is used only for facilitating the understanding of the methods and the core idea of the present invention. It should be noted that for the skilled in the art, a number of variations and modifications can be made to the present invention without departing from the principles of the present invention, such variations and modifications also fall within the scope claimed by the present invention as set forth in the claims.

The invention claimed is:

1. A biaxially oriented polypropylene film substrate which is free from primer, characterized in that it comprises successively connected affinity layer, core layer and surface layer, the affinity layer comprises 10% to 80% by weight of polypropylene homopolymer, 10% to 80% by weight of polyolefin plastomer and 1% to 10% by weight of anti-adhesion agent; the core layer is polypropylene homopolymer; the surface layer is the same as the affinity layer or a non-coated surface layer, said non-coated surface layer comprises 90% to 99% by weight of polypropylene homopolymer and 1% to 10% by weight of anti-adhesion agent.

2. The biaxially oriented polypropylene film substrate according to claim 1, characterized in that the thickness of the affinity layer is 1 μm to 10 μm.

3. The biaxially oriented polypropylene film substrate according to claim 1, characterized in that the thickness of the non-coated surface layer is 1 μm to 10 μm.

4. The biaxially oriented polypropylene film substrate according to claim 1, characterized in that the total thickness of the biaxially oriented polypropylene film substrate free from primer is 10 μm to 60 μm.

5. The biaxially oriented polypropylene film substrate according to claim 1, characterized in that the active ingredients content of the anti-adhesion agent is 500 PPM to 5000 PPM.

6. A coated film free from primer, characterized in that: said film comprises the biaxially oriented polypropylene film substrate according to claim 1, and a coating layer placed on the surface of the substrate, said coating layer is polyvinylidene chloride coating, acrylic acid coating or modified polyvinyl alcohol coating;

the polyvinylidene chloride coating is formed by coating the substrate surface with the following ingredients followed by drying: 30% to 95% by weight of polyvinylidene chloride emulsion, 0 to 50% by weight of softened water, 1% to 12% by weight of slip agent and 0.05% to 5% by weight of anti-adhesion agent; said polyvinylidene chloride emulsion is formed by reaction of 85% to 95% by weight of polyvinylidene chloride, 0.5% to 10% by weight of methyl methacrylate, 0.5% to 3.5% by weight of methyl acrylate, 0.01% to 0.3% by weight of catalyst and 0.2% to 3.5% by weight of emulsifying agent;

the acrylic acid coating is formed by coating the substrate surface with the following ingredients followed by drying: 25% to 95% by weight of acrylic acid emulsion, 0 to 70% by weight of softened water, 2% to 15% by weight of slip agent and 0.1% to 5% by weight of anti-adhesion agent, said acrylic acid emulsion is formed by copolymerization of 10% to 80% by weight of acrylic acid and 20% to 90% by weight of methyl acrylate or ethyl acrylate;

the modified polyvinyl alcohol coating is formed by coating the substrate surface with the following ingredients followed by drying: 50% to 100% by weight of modified polyvinyl alcohol solution, 0 to 40% by weight of softened water, 0 to 10% by weight of slip agent and 0 to 4% by weight of anti-adhesion agent; said polyvinyl alcohol solution is formed by reaction of 5% to 15% by weight of polyvinyl alcohol, 82% to 92% by weight of softened water, 0.05% to 0.1% by weight of catalyst, 0.5% to 2% by weight of condensing agent, 0.1% to 0.5% by weight of antifoaming agent and 0.5% to 1.5% by weight of anti-adhesion agent.

7. The coated film according to claim 6, characterized in that: the coating layer is placed on one surface or both surfaces of the substrate.

8. The coated film according to claim 6, characterized in that the solid content of the polyvinylidene chloride coating is 20% to 60%, the solid content of slip agent is 10% to 30%, and the solid content of anti-adhesion agent is 5% to 20%.

9. The coated film according to claim 6, characterized in that the solid content of the acrylic acid emulsion is 10% to 50%, the solid content of slip agent is 10% to 30%, and the solid content of anti-adhesion agent is 5% to 20%.

10. The coated film according to claim 6, characterized in that the solid content of the modified polyvinyl alcohol solution is 5% to 20%, the solid content of slip agent is 10% to 30%, and the solid content of anti-adhesion agent is 5% to 20%.

11. The coated film according to claim 6, characterized in that the thickness of the polyvinylidene chloride coating is: 0.3 μm to 6.0 μm; the thickness of the acrylic acid coating is: 0.3 μm to 3.5 μm; and the thickness of the modified polyvinyl alcohol is: 0.3 μm to 2.0 μm.

12. The coated film according to claim 6, characterized in that the slip agent is palm wax.

13. The coated film according to claim 6, characterized in that the anti-adhesion agent is silicon dioxide.

14. A manufacturing method of a coated film, characterized in that said method comprises:

the biaxially oriented polypropylene film substrate according to claim 1 is subjected to corona treatment;

the polyvinylidene chloride coating, acrylic acid coating or modified polyvinyl alcohol coating is uniformly coated onto the corona surface of the biaxially oriented polypropylene film substrate, and the film is dried after the completion of coating to obtain coated film;

the polyvinylidene chloride coating is formed by coating the substrate surface with the following ingredients followed by drying: 30% to 95% by weight of polyvinylidene chloride emulsion, 0 to 50% by weight of softened water, 1% to 12% by weight of slip agent and 0.05% to 5% by weight of anti-adhesion agent; said polyvinylidene chloride emulsion is formed by reaction of 85% to 95% by weight of polyvinylidene chloride, 0.5% to 10% by weight of methyl methacrylate, 0.5% to 3.5% by weight of methyl acrylate, 0.01% to 0.3% by weight of catalyst and 0.2% to 3.5% by weight of emulsifying agent;

the acrylic acid coating is formed by coating the substrate surface with the following ingredients followed by drying: 25% to 95% by weight of acrylic acid emulsion, 0 to 70% by weight of softened water, 2% to 15% by weight of slip agent and 0.1% to 5% by weight of anti-adhesion agent, said acrylic acid emulsion is formed by copolymerization of 10% to 80% by weight of acrylic acid and 20% to 90% by weight of methyl acrylate or ethyl acrylate;

the modified polyvinyl alcohol coating is formed by coating the substrate surface with the following ingredients followed by drying: 50% to 100% by weight of modified polyvinyl alcohol solution, 0 to 40% by weight of softened water, 0 to 10% by weight of slip agent and 0 to 4% by weight of anti-adhesion agent; said polyvinyl alcohol solution is formed by reaction of 5% to 15% by weight of polyvinyl alcohol, 82% to 92% by weight of softened water, 0.05% to 0.1% by weight of catalyst, 0.5% to 2% by weight of condensing agent, 0.1% to 0.5% by weight of antifoaming agent and 0.5% to 1.5% by weight of anti-adhesion agent.

15. The manufacturing method of the coated film free from primer according to claim 14, characterized in that: the coating weight of the polyvinylidene chloride coating is 0.4 g/m$^2$-7.5 g/m$^2$; the coating weight of the acrylic acid coating is 0.35 g/m$^2$-4.0 g/m$^2$; the coating weight of the modified polyvinyl alcohol coating is 0.25 g/m$^2$-1.8 g/m$^2$.

16. The manufacturing method of the coated film free from primer according to claim 14, characterized in that: the coating speed is 100 m/min-250 m/min.

17. The manufacturing method of the coated film free from primer according to claim 14, characterized in that: the drying mode is one of hot air drying and far infrared drying, or using both of them simultaneously; the drying temperature is 90° C.-140° C., and drying time is 5 seconds-20 seconds.

18. The manufacturing method of the coated film free from primer according to claim 14, characterized in that: the coating is reverse roll-kiss coating.

* * * * *